May 7, 1940.  J. FLEISCHMAN  2,199,833
NAIL DRIVER
Filed March 31, 1939
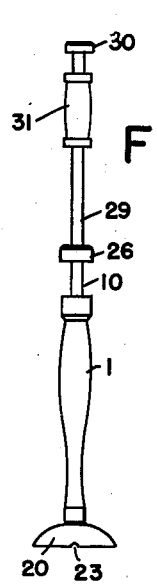
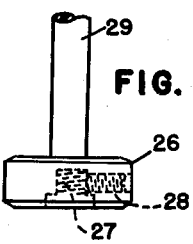
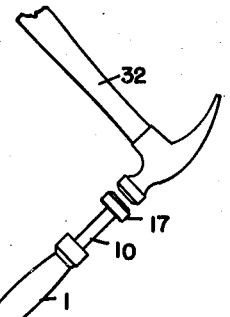
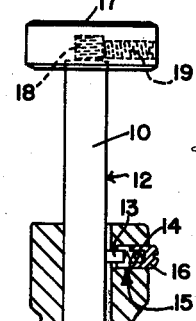
JOHN FLEISCHMAN
Inventor
By Herbert E. Smith
Attorney Patented May 7, 1940

2,199,833

UNITED STATES PATENT OFFICE 2,199,833

NAIL DRIVER

John Fleischman, Uniontown, Wash.

Application March 31, 1939, Serial No. 265,259

2 Claims. (Cl. 1—47)

My present invention relates to a nail driver and nail set of the type which will securely hold and guide the nail preliminarily to and while it is being driven into the material to be nailed.

A primary object of my invention is to provide a device which is particularly adapted to the use of carpenters and similar workmen in nailing flooring, siding, and ceiling material, or for use in cabinet building to more accurately assist them in nailing without scarring the materials.

Another object of my invention is the provision of a device which will hold a nail to be driven and at the same time protect the surface through which the nail is to be pressed.

A further object of the invention is the provision of a nail-driving device which consists of relatively few parts, is simple of construction, and will stand extremely rough usage for a long period of time.

A still further object of my invention is to provide adapting means whereby the device can be adapted to the form or slope of various surfaces to be worked upon.

Another and further object of the invention is also to provide adapting means whereby the device may be used in extremely tight places without the necessity of the customary hand hammer, thereby being a self-striking nail driver.

Other objects and advantages of the invention will be apparent during the course of the following description.

In the accompanying drawing, forming a part of this specification, and in which like numerals are employed to designate like parts throughout the same:

Figure 1 is a view in elevation of the nail driver of my invention showing adapted thereto an integral striker unit and Figure 1A is a slightly enlarged detail showing the manner in which the striker unit is attached to the device of Figure 1.

Figure 2 illustrates the nail driver of my invention in operative position, as for nailing floor, sheathing, or ceiling material.

Figure 3 is a longitudinal sectional view through the device of my invention.

Referring to Figure 3 my device is shown as having a grip shank 1 which has an interior central bore 2 that tapers at 3 to form the striker bore 4. The lower end of the shank 1 is provided with a threaded boss 5. A nail retainer ball 6 is seated in an opening 7 and held under tension by means of a spring 8. The spring and ball are secured in place in the shank by the screw 9. Slidably mounted, within the bores 2 and 4, is an operating plunger 10 having a striker rod 11 at its lower end. The outside diameter of the plunger 10 is substantially that of the bore 2 and the diameter of the rod 11 is substantially that of the bore 4. One side of the rod 10 is flattened at 12 and a friction button 13 is tensioned thereupon by means of the spring 14 which is held in position in the socket 15 by the screw 16. A striker head 17 is supported upon the upper end of the rod 10 by means of its engagement with a threaded boss 18 formed on the rod 10. A set screw 19 securely locks the head against displacement.

A V-shaped head 20 having an interiorly threaded collar 21 engages the threaded boss 5 and is securely locked by means of the set screw 22. A central opening 23 registers with the bore 4 to permit the insertion of a nail into the interior of the shank 1. The head 20 is indicated in Figure 2 to be V-shaped and gradually curves at each end to present a graceful appearance. At one end a claw 24 is formed in the V-edge and at the opposite end the inner surface of the V, at 25, is ground down to serve in lifting nails which may be bent over and embedded in the wood.

As shown in Figure 1 an auxiliary striker head 26 having interior threads 27 and a set screw 28 is fashioned on the lower end of a rod 29. A stop head 30 is provided at the opposite end of the rod and a striker member 31 operates slidably upon the rod between the heads and makes the device a self-driving nail set.

In nailing flooring of the tongue and groove type as shown in Figure 2, the V-head 20 is brought to rest at the juncture of the edge-tongue with a body of the flooring or ceiling material and through the use of a hand hammer 32 a nail such as 33 is driven at a suitable angle through the finished flooring 34 into the sub-flooring 35.

In operation the plunger 10 is withdrawn from the bore 2, the limit permitted by the friction button 13 abutting the shoulder 45 at the end of the flattened surface 12. The mechanic using the device inserts a nail, usually of the "finish" type into the opening 23 of the V-shaped head 20. The nail is frictionally engaged by the spring-pressed retainer button 6 and held lightly but securely against dislodgement.

In nailing flooring the mechanic uses a hand hammer 32 or a striker block as 31 in Figure 1 and he makes repeated blows upon the head of the plunger 10 thus securely driving the nail in direct forceful blows.

When the plunger 10 has travelled downwardly into the bore 2 so that the head 17 or 26, as the case may be, abuts the upper face of the shank 1, the nail will be seated just below the surface of the wood into which it is driven. The plunger may have circumferential gauge marks to indicate the relative position of the nail head, or spacer disks may be secured around the plunger 10 and under the head 17 to regulate the travel thereof.

In attaching the auxiliary striker head 26 the operator loosens the set screw 19 and unthreads the head 17 from the plunger 10. The head 26 is then threaded on the boss 18 and securely locked by means of the set-screw 28. By grasping the sliding block 31, and forcefully sliding it downwardly along the rod 29, the impact upon the head 26 is the same as when a hand hammer is used on the head 17. This arrangement is extremely useful in tight places where it is practically impossible for a carpenter to swing his hand hammer.

Having thus fully described my invention, what I claim as new and desire to secure by Letters Patent is:

1. In a nail driver, the combination of a grip shank having interior bores of different diameters, the larger bore being located in the upper portion of said shank, and a threaded boss on the lower extremity of said shank; a slidable striker rod having portions adapted to fit said interior bores, the larger of said portions being flattened along one side, and a striker head threadably secured upon the upper end of the striker rod; friction means in said shank operable upon the flattened portion of the striker rod and comprising a friction button supported in a socket in said shank permitting slidable engagement with the rod, a screw threaded in said socket and a spring between said button and said screw for tensioning the button; nail retaining means adjacent the lower end of said shank comprising a retainer ball seated in an opening therein, a screw in the outer end of said opening and a spring between said screw and said ball; a V-shaped detachable surface-contacting head adapted to fit into angular junctures of the material being nailed and having an opening registering with the bore of the shank, and a threaded collar on said head for engagement over the boss on the shank.

2. In a nail driver, the combination of a grip shank having interior bores of different diameters, the larger bore being located in the upper portion of said shank, and a threaded boss on the lower extremity of said shank; a slidable striker rod having portions adapted to fit said interior bores, the larger of said portions being flattened along one side, and a striker head threadably secured upon the upper end of the striker rod; friction means in said shank operable upon the flattened portion of the striker rod and comprising a friction button supported in a socket in said shank permitting slidable engagement with the rod, a screw threaded in said socket and a spring between said button and said screw for tensioning the button; an extension rod on said striker head and having outward stop means, a slidable striker member on said rod for cooperation with the striker head in driving nails, nail retaining means adjacent the lower end of said shank comprising a retainer ball seated in an opening therein, a screw in the outer end of said opening and a spring between said screw and said ball; a V-shaped detachable surface-contacting head adapted to fit into angular junctures of the material being nailed and having an opening registering with the bore of the shank, and a threaded collar on said head for engagement over the boss on the shank.

JOHN FLEISCHMAN.